Nov. 8, 1927.                                                1,648,855
E. LYTTON
NAIL, SCREW NAIL, AND THE LIKE
Filed Dec. 22. 1924
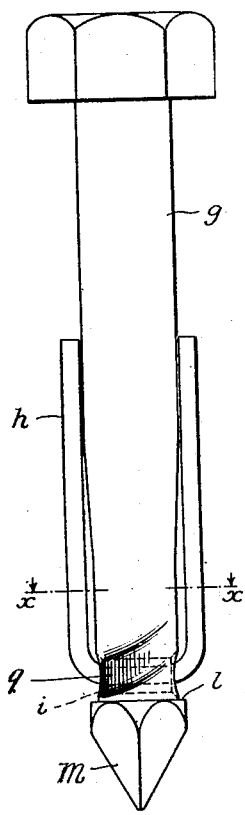
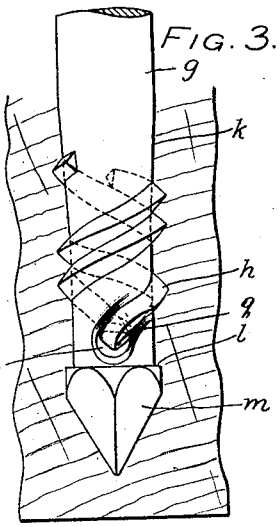
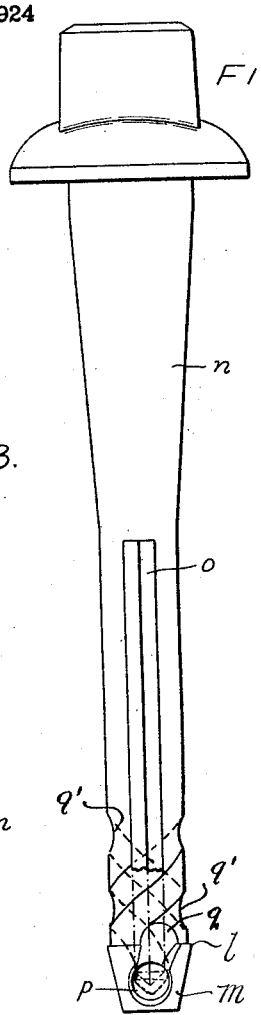
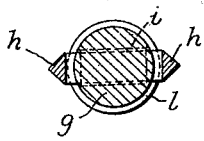
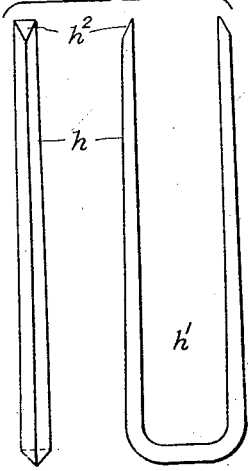
Inventor
Edward Lytton,
by
James L. Norris
Attorney.

Patented Nov. 8, 1927.

1,648,855

UNITED STATES PATENT OFFICE.

EDWARD LYTTON, OF LONDON, ENGLAND.

NAIL, SCREW NAIL, AND THE LIKE.

Application filed December 22, 1924, Serial No. 757,481, and in Great Britain February 28, 1924.

This invention relates to improvements in that class of nail, spike or like securing device whose shank is provided near its point with a transverse eye or hole through which passes a strip of flexible metal, the two terminal portions of which are bent to constitute two limbs which, respectively, initially extend along opposite side portions of the shank and serve to hold the device firmly after this has been driven partly or wholly into the material that is to be secured and then revolved to cause the strip to coil itself around the shank similarly to the threads of a screw, thereby tending to prevent the removal from the material of the securing device by direct outward movement.

It has been found in practice that such securing devices frequently fail to coil as desired by reason of the metal strip fracturing at the points along its length where it enters or issues from the ends of the hole in the shank, the fracturing being due to the great strain at those points and to the pressure between the strip and the edges of the said hole causing the strip to be cut or severed. The object of the present improvements is to obviate or minimize the risk of such drawbacks occurring, and to provide means whereby, in the event of a fracture of a coiled strip, the outward withdrawal of the shank of the securing device through the bore of the coiled strip may be prevented. To these ends, according to the invention, the ends of the hole in the shank are preferably countersunk, and, in order to assist a strip to coil and to protect the strip from injury where it enters and passes out of the transverse hole in the shank, helically directed rounded recesses are provided on the surface of the shank, one recess on each side thereof, and one end of each recess being arranged to merge into an end of the said hole.

With a view to minimizing the risk of a strip being fractured, it may, for a portion of its length intermediate of its ends, be given a cross sectional area greater than that of the terminal portions, or in other words the strip may be tapered from the central portion of its length towards its ends.

To further assist a strip in commencing to coil itself about a shank, shallow helical grooves may be provided on the outer face of the shank, such grooves being arranged to commence from the ends of the rounded recesses.

A shoulder extending radially outward may be provided on the shank of the improved securing device between its transverse eye and its point or end, so that, in the event of a coiled strip breaking or of any tendency of the shank to draw out of the hole in the material through which it has been driven, the shank is prevented from withdrawing from within the coiled strip by reason of the shoulder moving into engagement with adjacent portions of the strip.

The invention will be further described with reference to the accompanying drawing, in which:—

Fig. 1 is an elevation of a dog spike showing a strip of flexible metal threaded through a transverse hole in its shank and given a U-shape, the strip having the position that is given to it relatively to the shank before the spike is put to use.

Fig. 2 is a section on the line $x$—$x$ in Fig. 2.

Fig. 3 is a sectional view showing a portion of the spike and the strip illustrated in Fig. 2, the spike having been driven into a piece of timber such as a railway sleeper and turned about its axis so as to cause the strip to coil.

Fig. 4 is an elevation of a railway chair bolt before use, the bolt having a strip of flexible metal threaded through a transverse hole near its end, a part of said strip being broken away.

Fig. 5 comprises two views of a modified form of a flexible metal strip.

In the arrangement shown in Figs. 1, 2 and 3, $g$ is the shank of a spike. At a short distance from the point $m$ of the spike a transverse hole $i$ is formed and through this hole is threaded a strip of flexible metal $h$ which preferably is triangular in cross-section, said strip being so arranged that about half its length is on one side of the axis of the spike and about half on the other side. The shank $g$ has on each side a shallow helically directed recess $q$, each of which recesses merges into one end of the transverse hole $i$. The wire or strip $h$ having been threaded through the hole, the two terminal portions are bent so as to lie along and in close proximity to the shank $g$, the wire or strip $h$ assuming a U-shape. When the spike is driven, with its tapered or pointed end $m$ first into a sleeper or other object and is turned about its axis the strip $h$ will become coiled about the shank $g$ and assume a position similar, more or less, to that shown in Fig. 3.

Should there be, owing to vibration or other cause, any tendency of the spike $g$ to draw out of the hole $k$ into which it has been driven, or through the strip $h$ coiled round it, a shoulder $l$ may be provided on the shank near its pointed end $m$ to prevent the spike withdrawing from within the coiled strip $h$ in the event of the strip being severed.

The strip $h$, instead of being of uniform section throughout its length as in Figs. 1 to 3, may be tapered towards each of its ends, as indicated for example at $h'$ in Fig. 5, so that the terminal portions of the two limbs of the U-shaped strip, as this is caused to pass through the material into which the spike is being forced and coils itself about the shank of the spike, will traverse a tapered passage and be therefore less liable to be damaged or fractured. The ends $h^2$ of the strip may be bevelled or chamfered to facilitate the withdrawal of the spike and its coiled strip from a sleeper $f$.

It has been found advantageous to taper the shank of the spike for a portion of its length, so as to provide a clearance between the strip $h$ and the shank, as shown, for example, in Fig. 2.

The railway chair bolt $n$ in Fig. 4 is shown provided with a flexible metal strip $o$ similar to the strip $h$ carried by the spike $g$ in Figs. 1 to 3, the strip $o$ passing through a hole $p$ near the point of the bolt.

To assist a strip, such as $h$ or $o$, in commencing to coil itself about a shank, shallow helical grooves as indicated at $q'$ in Fig. 5 may be provided on the shank, the grooves being of any desired length and arranged to commence from inclined rounded helically directed recesses $q$, which are located one on each side of the shank, and merge into the two ends of the transverse hole. The recesses $q$ are provided to assist a strip, or strips, to coil and to minimize the risk of fracture of a strip while being coiled in very hard material.

The portion of the flexible metal strip which extends through the transverse hole of the spike or bolt may be of larger cross-section than the terminal portions of such strip in order to avoid fracture of the strip when the spike or bolt is driven.

Having thus described the nature of the said invention and the best means I know of carrying the same into practical effect, I claim:—

1. In a nail or spike of the class described, a substantially round shank having a transverse eye and provided on its surface with helically directed rounded recesses, one of said recesses being positioned on each side of the shank, and one end of each recess being arranged to merge into one of the ends of the transverse eye in the shank, substantially as and for the purpose described.

2. A nail or spike, according to claim 1, wherein a flexible metal strip extends through the transverse eye of the shank and wherein the shank has a shoulder extending radially outward between the tapered terminal part of the shank and its transverse eye to engage adjacent portions of the flexible metal strip, substantially as and for the purposes described.

3. In a nail or spike, of the class described, a substantially round shank having a transverse eye and provided on its surface with helically directed rounded recesses, one of said recesses being positioned on each side of the shank, said recesses each merging into one of the ends of the transverse eye in the shank, and said shank further having on its surface shallow helical grooves forming extensions of the said recesses, substantially as and for the purposes described.

4. A nail or spike according to claim 1, wherein a flexible metallic strip extends through the transverse eye of the shank and the shank has a shoulder extending radially outward between the tapered terminal part of the shank and its transverse eye to engage adjacent portions of the flexible metal strip, said shank further having on its surface shallow helical grooves forming extensions of the said recesses, substantially as and for the purpose described.

5. A nail or spike according to claim 1, wherein a flexible metal strip of substantially triangular cross-section extends through the transverse eye of the shank and having its terminal portions bent substantially parallel with the axis of the shank.

6. A nail or spike according to claim 1, wherein a flexible metal strip extends through the transverse eye of the shank and has its terminal portions extending substantially parallel to the axis of the shank, and of which strip the portion which extends through said transverse eye is of greater cross-sectional area than the terminal portions thereof.

In testimony whereof I have signed my name to this specification.

EDWARD LYTTON.